United States Patent [19]
Lee et al.

[11] Patent Number: 5,377,264
[45] Date of Patent: Dec. 27, 1994

[54] MEMORY ACCESS PROTECTION CIRCUIT WITH ENCRYPTION KEY

[75] Inventors: Young W. Lee, Orange; Sungwon Moh, Wilton; Arno Muller, Westport, all of Conn.

[73] Assignee: Pitney Bowes Inc., Stamford, Conn.

[21] Appl. No.: 163,774

[22] Filed: Dec. 9, 1993

[51] Int. Cl.$^5$ ............................................. H04L 9/00
[52] U.S. Cl. ........................................... 380/4; 380/23; 380/25; 380/49; 380/50; 340/825.31; 340/825.34; 365/189.07; 395/425
[58] Field of Search .................... 380/4, 21, 23, 25, 43, 380/49, 50; 340/825.31, 825.34; 365/189.07; 395/425

[56] References Cited

U.S. PATENT DOCUMENTS

| | | | |
|---|---|---|---|
| 4,424,573 | 1/1984 | Eckert, Jr. et al. | 364/464.02 |
| 4,580,217 | 4/1986 | Celio | 395/425 |
| 4,710,882 | 12/1987 | DiGiulio et al. | 364/464.02 |
| 4,757,468 | 7/1988 | Domenik et al. | 380/4 X |
| 4,817,004 | 3/1989 | Kroll et al. | 364/464.02 |
| 4,903,299 | 2/1990 | Lee et al. | 380/25 |
| 4,998,203 | 3/1991 | DiGiulio et al. | 364/464.02 |
| 5,142,676 | 8/1992 | Fried et al. | 395/425 |
| 5,216,633 | 6/1993 | Weon et al. | 365/189.07 |

Primary Examiner—Bernarr E. Gregory
Attorney, Agent, or Firm—Charles G. Parks, Jr.; Melvin J. Scolnick

[57] ABSTRACT

A data verification system including a circuit verifies that unlocking data generated by a microprocessor to be written into the ASIC before a memory write is valid. The microprocessor is programmed to generate an ASIC address when unlocking data is to be written to the ASIC and to encrypt and decrypt that data. The verifying circuit unit receives the encrypted data and decrypts the encrypted data and compares the decrypted data with the encrypted data. The verifying circuit generating an enable signal only if the comparison is true. An address decoding unit is provided for receiving the memory address signal and causing a memory write enable signal to be generated for the memory unit only if the verifying circuit unit has generated an enable signal. Registers unit in communication with the data bus and the verifying circuit unit are provided for writing decryption parameters in the register unit in accordance with the programming of the microprocessor during power-up of the microprocessor.

8 Claims, 6 Drawing Sheets

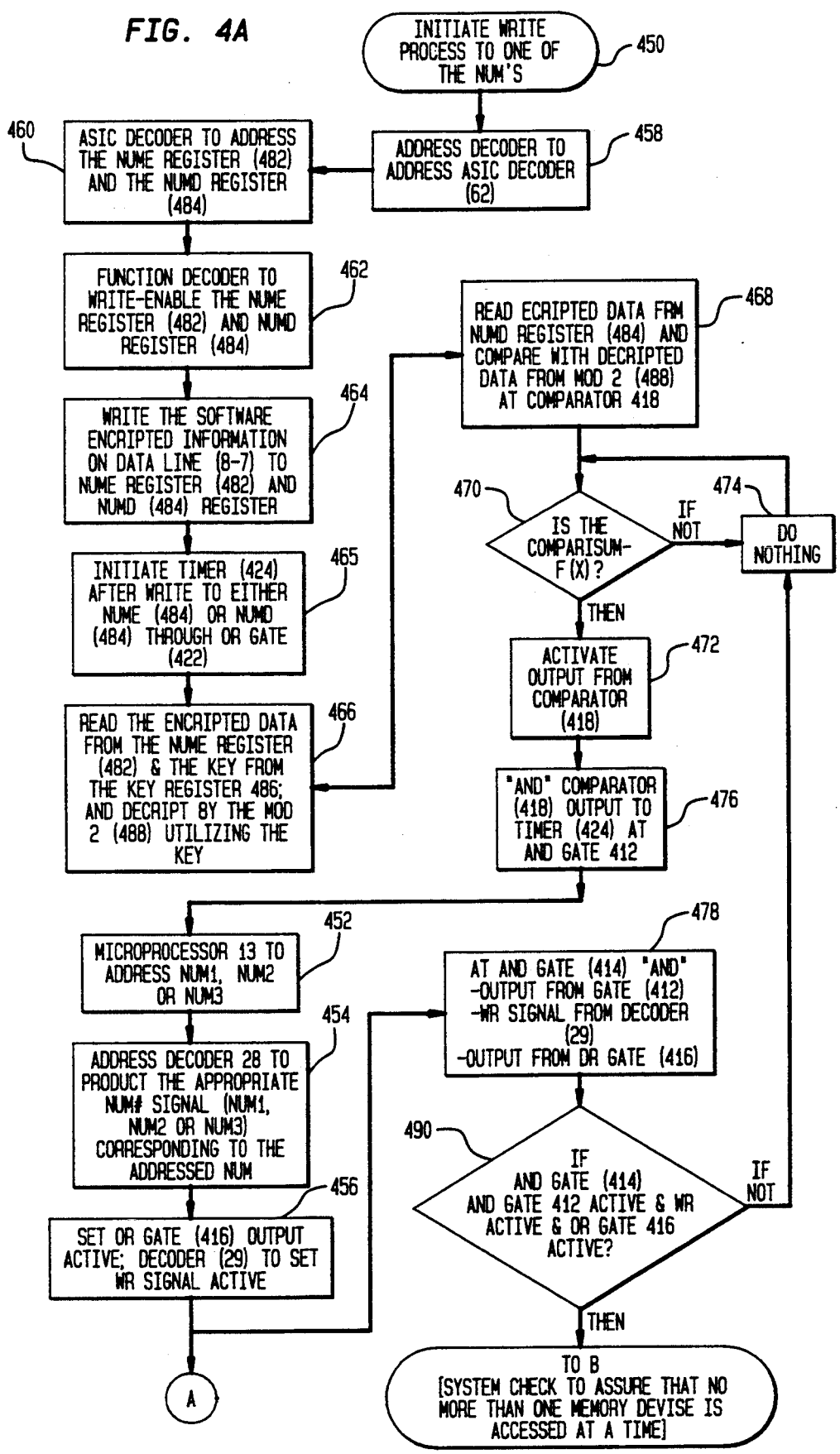

MEMORY ACCESS PROTECTION CIRCUIT WITH ENCRYPTION KEY

RELATED APPLICATIONS

The following co-pending applications are commonly assigned to Pitney Bowes Inc., filed concurrently on Dec. 9, 1993, U.S. patent application Ser. No. 08/163,627, entitled MULTIPLE PULSE WIDTH MODULATION CIRCUIT; U.S. patent application Ser. No. 08/137,460 entitled DUAL MODE TIMER-COUNTER; U.S. patent application Ser. No. 08/165,134, entitled DYNAMICALLY PROGRAMMABLE TIMER-COUNTER; U.S. patent application Ser. No. 08/163,811, entitled MEMORY MONITORING CIRCUIT FOR DETECTING UNAUTHORIZED MEMORY ACCESS: U.S. patent application Ser. No. 08/163,771, entitled MULTI-MEMORY ACCESS LIMITING CIRCUIT FOR A MULTI-MEMORY DEVICE; U.S. patent application Ser. No. 08/163,790, entitled ADDRESS DECODER WITH MEMORY ALLOCATION FOR A MICRO-CONTROLLER SYSTEM; U.S. patent application Ser. No. 08/163,810 entitled INTERRUPT CONTROLLER FOR AN INTEGRATED CIRCUIT U.S. patent application Ser. No. 08/163,812, entitled ADDRESS DECODER WITH MEMORY WAIT STATE CIRCUIT; U.S. Pat. application Ser. No. 08/163,813, entitled ADDRESS DECODER WITH MEMORY ALLOCATION AND ILLEGAL ADDRESS DETECTION FOR A MICRO-CONTROLLER SYSTEM; U.S. patent application Ser. No. 08/164,100, entitled PROGRAMMABLE CLOCK MODULE FOR POSTAGE METERING CONTROL SYSTEM and U.S. patent application Ser. No. 08/163,629, entitled CONTROL SYSTEM FOR AN ELECTRONIC POSTAGE METER HAVING A PROGRAMMABLE APPLICATION SPECIFIC INTEGRATED CIRCUIT.

BACKGROUND OF THE INVENTION

The present invention relates to a control system having one or more memory units and a circuit for enabling access to the memory units for writing information into selected ones of the memory units under particular circumstances and, more particularly, to a protection circuit having means of preventing writing of unintended data to the memory units.

In a conventional postage metering system, it is known to provide an accounting system for recording the amount of funds and other transaction information dispensed during the metering process. These records are electronically maintained in the non-volatile memory units which are part of the accounting system. Because of microcontroller system anomalies, it is important to prevent writing of spurious data into the nonvolatile memory. It is known to provide the accounting system with a circuit for latching the non-volatile memories inactive, thereby preventing writing, and requiring the microprocessor to latch open a gate means following the issuance of a write signal and a chip select signal from the microprocessor. After the intended write cycle is completed, the microprocessor causes the gate to be closed.

It has been determined that under certain anomalous conditions, an unintentional write process may be issued by the microprocessor to an address decoder unit which in response thereto enables the gate. Under this condition an unintended write can occur.

SUMMARY OF THE INVENTION

It is an objective of the present invention to provide a circuit for testing the data used to unlock a memory in the presence of a microprocessor instruction to write to the memory to assure that the data is a valid data type.

It is a further objective of the present invention to provide an additional measure of security for the accounting system by providing a monitoring circuit which detects when the nonvolatile memory units of the accounting system have been accessed independently of the metering process.

It is a still further objective of the present invention to provide the monitoring circuit with the ability to be programmed with a decryption algorithm by the microprocessor such that a prescribed relationship exist between the decrypted data and the encrypted data to verify valid data and to enable memory enabling for writing only after that verification.

A microprocessor control system is provided which as one of its function is to maintain the accounting record of a postage metering system. The control system includes a programmable microprocessor, read-only memory or program memory (ROM), random access memory (RAM) and one or more nonvolatile memories (NVM). The transaction record are maintained in the NVMs. An application specific integrated circuit (ASIC) is also provided. The ASIC, in response to proper instructions from the microprocessor as one of its responsibilities, read enables or write enables the NVMs.

The microprocessor is programmed to encrypt the unlocking data prior to addressing the ASIC for access to the accounting memories for writing of accounting data. The ASIC includes a circuit which decrypts the encrypted data and compares the decrypted data to the encrypted data. If that comparison is true, then the ASIC enables the accounting memories for writing of accounting data into the accounting memories. If that comparison is not true, then the ASIC control signal which enables the accounting memories for writing are inhibited. In this manner, the present anomalous condition in the control circuit which results in spurious data and control signals being generated will not precipitate a write to the accounting memories thereby preserving the integrity of the accounting memories.

Additional advantages and benefits of the present invention will be apparent from the detailed description of the preferred embodiment later presented.

BRIEF DESCRIPTION OF THE DRAWINGS

FIGS. 4A, 4B and 4C are logic diagrams of the ASIC memory circuit in accordance with the present invention.

DETAILED DESCRIPTION OF THE PREFERRED EMBODIMENT

Figure 1:
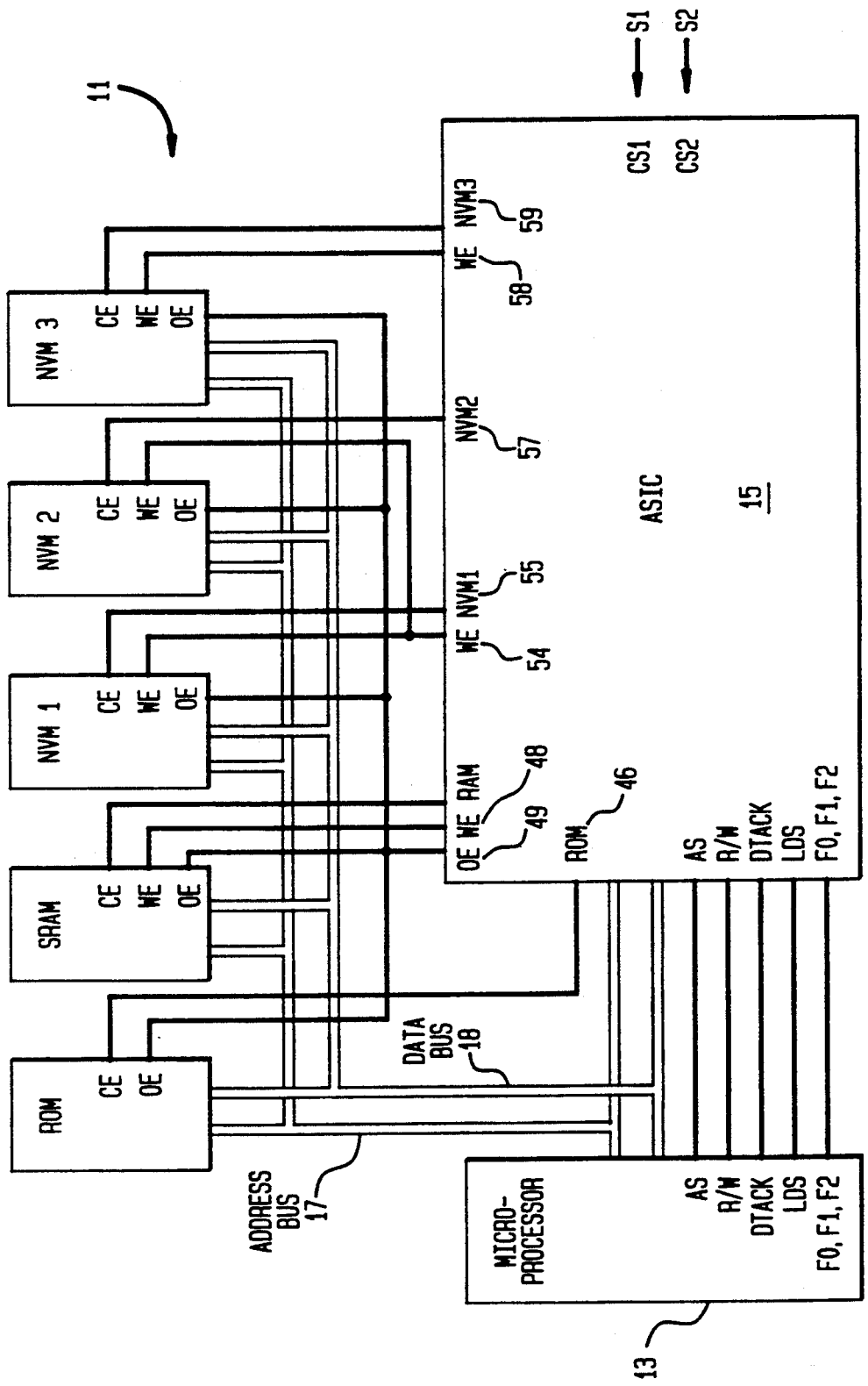
FIG. 1 is a schematic of a microcontroller system in accordance with the present invention.

Referring to FIG. 1, a microcontroller system, generally indicated as 11, is comprised of a microprocessor 13 in bus 17 and 18 communication with an application specific integrated circuit (ASIC) 15, a read only memory (ROM), a random access memory (RAM) and a plurality of non-volatile memories (NVM1, NVM2, NVM3). The microprocessor 13 also communicates with the ASIC 15 and memory units by way of a plurality of control line, more particularly described subsequently. It should be appreciated that, in the preferred embodiment, the ASIC 15 includes a number of circuit modules or units to perform a variety of control functions related to the operation of the host device, which, in the present preferred embodiment, the host device is a postage meter mailing machine. However, for the purpose of the present invention only the processor interface 19, address decoder 20 and memory security unit 400 will be here particularly described.

Figure 2:
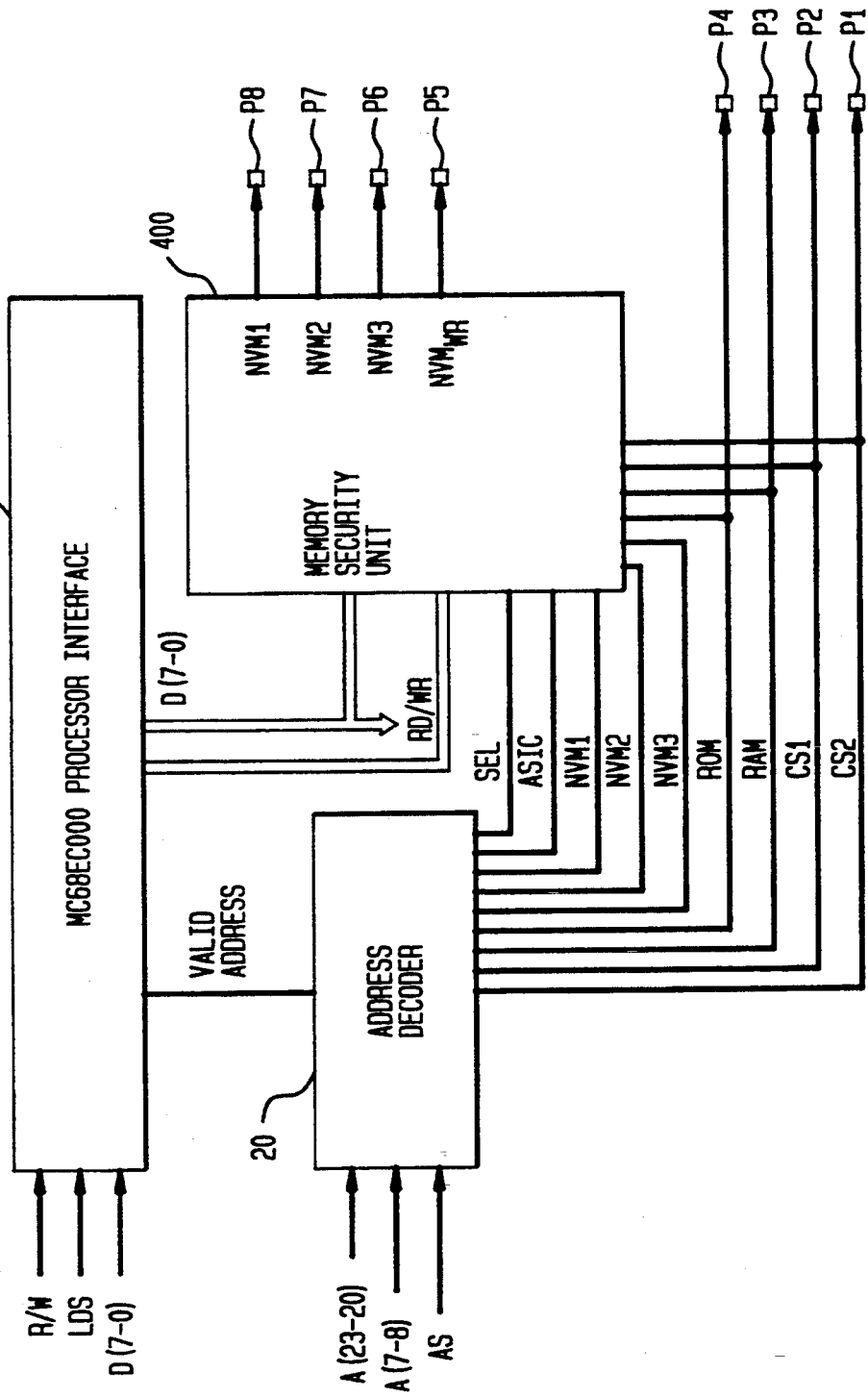
FIG. 2 is a partial schematic of the ASIC address decoder unit and ASIC NVM security circuit, data verification circuit in accordance with the present invention.

Referring to FIGS. 1 and 2, the microprocessor 13 communicates the read/write (R/W) control signal, low data strobe (LDS) signal, address strobe (AS) signal, data bus lines D(7-0 and address lines A(7-0, 23-20) to the input side of the ASIC 15. The R/W, LDS and data signals (D7-0) are received by a microprocessor interface circuit 19. The processor interface circuit 19 performs a number of interface functions with the microprocessor. Those function relevant to the present invention will be described subsequently. The address lines and the AS signal from the microprocessor 13 are received by the address decoder circuit 20 of the ASIC 15.

The address decoder circuit 20 outputs a number of memory access control signals directed to the memory security unit 400. Particularly, the address decoder 20 directs the ROM and RAM chip select signals to the ASIC pins P3 and P4. The address decoder 20 also directs chip select signals CS1 and CS2 to ASIC pins P2 and P1. In the preferred embodiment of the present invention, the chip select signals CS1 and CS2 are provided in order to control memory access to external memory devices (not shown). Each of the chip select signals, RAM, ROM, CS1 and CS2 are also directed to the input side of a NVM security controller circuit 400 of the ASIC 15. Further directed to the input side of the NVM security controller circuit are the select signal (SEL), read signal (RD), write (WR), ASIC internal memory assess select signal (ASIC), NVM1 select, NVM2 select and NVM3 select signals from the address decoder 20.

Figure 3:
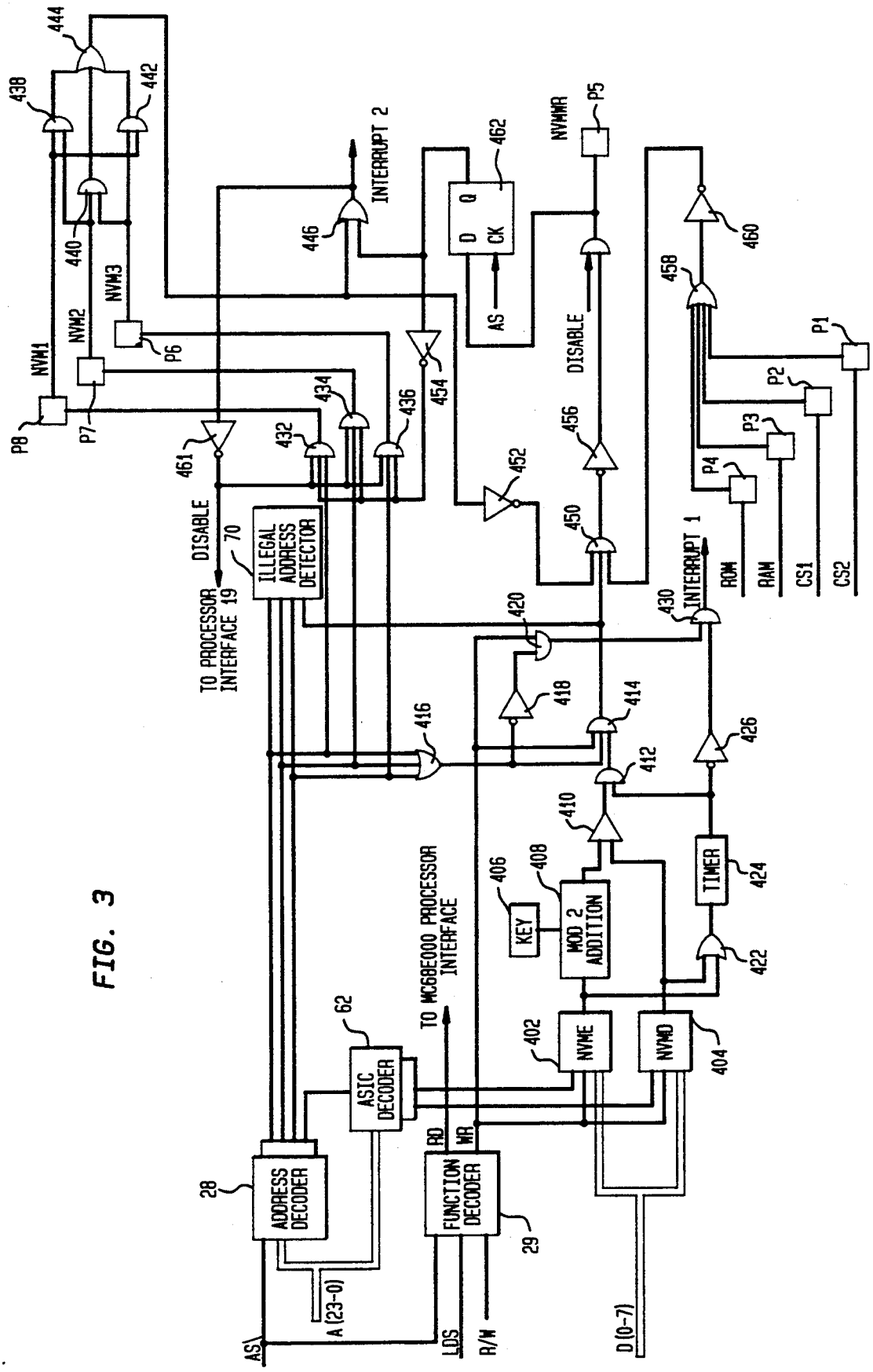
FIG. 3 is a logic schematic of the ASIC memory access and memory monitoring circuits in accordance with the present invention.

Referring to FIG. 3, the address decoder circuit includes an address decoder 28, an ASIC decoder 62 and a function decoder 29 which decoders will be here functionally described only to the extent relevant to the present invention. The address decoder 28 receives an AS strobe signal and address lines A(0-23) from the microprocessor. The function decoder 29 receives the AS strobe signal, LDS strobe and R/W enable signal. The NVM security circuit 400 includes an illegal address detector circuit 70, more particularly described in U.S. patent application Ser. No. 08/163,813, commonly assigned and here incorporated by reference.

A NVME register 402 and NVMD register 404 are also provided which receive input from data lines D(7-0), the function decoder 29 and ASIC decoder 62. The output from the NVME 402 is directed to a decryption circuit which needs a secret key from key register 406 and decrypts in the MOD 2 addition circuit 408. The decrypted output from the MOD 2 is compared by the comparator 410 with the encrypted data written to the NVMD register 404. Briefly here described, the data placed on D(7-0) is encrypted by the programmable microprocessor to have a specific relation to the decryption of that data by the Mod 2 Addition circuit. If that relationship is detected by the comparator 410, the output of the comparator 410 go active and is gated through gates 412, 414 and 450 to activate the NVMWR pin P5 of the ASIC under the proper condition subsequently described. The presence of the address strobe signal AS which initiated the sequence of events previously described at flip-flop 462 holds the flip-flop 462 output inactive even in the presence of a valid NVMWR signal. If the NVMWR is externally activated without the presence of an address strobe AS signal the flip-flop 462 is caused to change state whenever AS is next enabled causing OR gate 446 to go active. If the OR gate goes active the state of gate 461 goes inactive disabling gates 432, 434 and 436, thereby disabling unauthorized memory access to the NVMs. The output of the OR gate 446 is also directed to the microprocessor interface unit 19 which communicates to the microprocessor the interrupt condition.

Referring, more particularly, to FIGS. 4A, 4B, 4C and 4D, during an normal write cycle, the write cycle is initiated at 450 by microprocessor 13 writing to ASIC registers to unlock the memory. The microprocessor 13 addresses decoder 28.

The address decoder 28 addresses the ASIC decoder 62 at 458. The address decoder 28 then addresses the NVME register 402 and the NVMD register 404 to receive data from the data lines 0-7 at 460. The function decoder 29 write-enables the NVME register 402 and NVMD register 404 to receive the data at 462. At this point the software encrypted information on data line (0-7) is written to NVME register 402 and NVMD 404 register at 464. The timer 424 is then initiated after the write to either NVME 402 or NVMD 404 and the OR gate 422 is activated. At 466 the encrypted data from the NVME register 402 is read and combined with the KEY, from the KEY register 406 and decrypt by the MOD 2 408 utilizing the KEY. At 468 the encrypted data is read from NVMD register 404 and compares with decrypted data from MOD 2 408 by 8 bit comparator 410. If the comparison is equal then the output from comparator 410 is set active at 472. If the comparison is not equal to a defined relationship at 470 then nothing occurs at 474. The inactive state occurs when spurious data is generated and written to the registers 402 and 404.

If a valid comparison is made at 470, the comparator 410 is activated at 472 and, at 476, the output of the comparator 410 is ANDed with the output of timer 424 at AND gate 412. At 478, an AND gate 414 ANDs the output from gate 412, WR signal from decoder 29 with the output from OR gate 416.

Subsequently, following activation of comparator 410, microprocessor 13 writes to one of the NVMs by addressing NVM1, NVM2 or NVM3 at 452. At 454 the address decoder 28 produces the appropriate NVM# signal (NVM1, NVM2 or NVM3) corresponding to the addressed NVM. Also the decoder 28 output address causes OR gate 416 to go active at 456. Also indicated at 456, the microprocessor 13 causes the function decoder 29 to produce a WR signal. OR gate 416 in turn activates gate 418. Then, address decoder 28 decodes the non-volatile memory address and activates gate 420 when the function decoder 29 generates WR signal, as described in 480 (refer to FIG. 4B). If, at 482, the timer is active then gate 426 is turned "OFF" and as a result, AND gate 430 is held "OFF" at 484. If, at 486, the timer is inactive, then gate 426 is turned "ON" at 488 causing AND gate 430 to turn "ON" and a "INTERRUPT TYPE 1" signal to be issued, indicating a time-out condition occurred, thereby prohibiting memory access.

Referring to FIG. 4A, at 478, an AND gate 414 ANDs the output from gate 412, WR signal from decoder 29 with the output from OR gate 416. If, at 490, gate 412 is activating gate 414 active and WR is active and OR gate 416 is active, then the system proceeds to check to assure that no more than one memory device is accessed at a time at 500. If not, then the system returns to location 474.

Figure 4B:
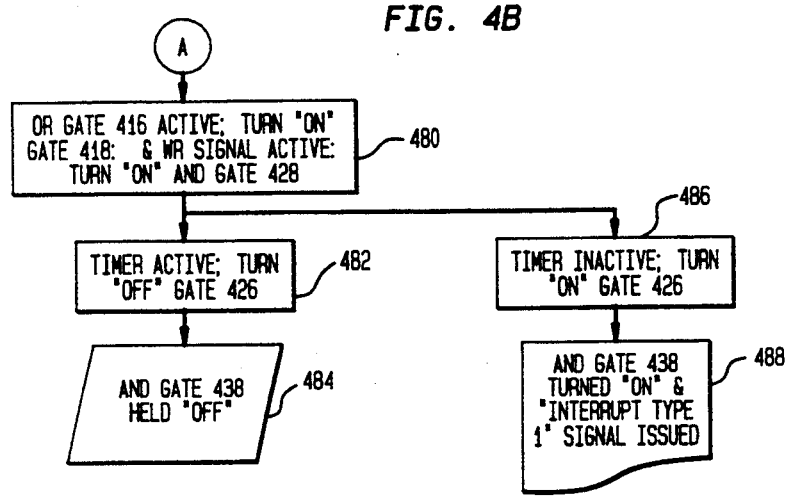
Figure 4C:
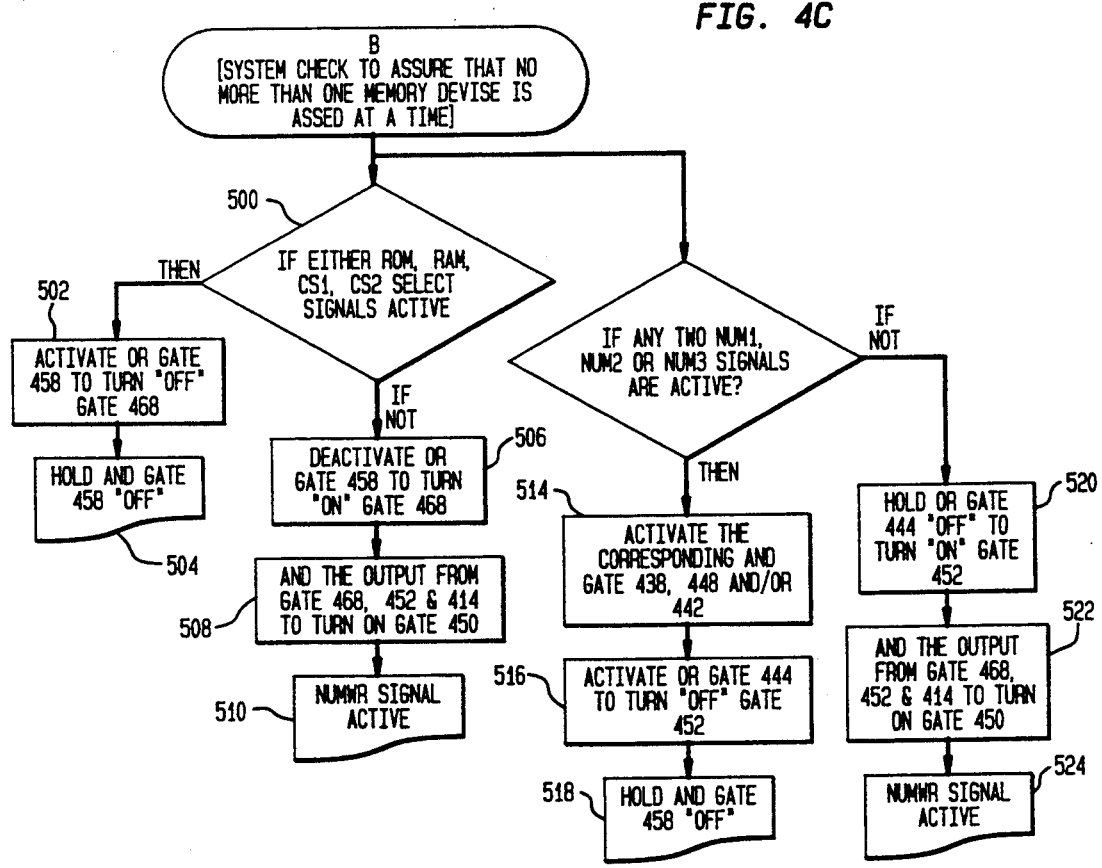

Referring to FIG. 4C, if, at 500, either ROM, RAM, CS1, CS2 select signals are active then OR gate 458 is activated to turn "OFF" gate 460 at 502 and hold AND gate 450 "OFF" at 504. This action prevents a non-volatile memory write enable signal from being issued. If, at 500, either the ROM, RAM, CS1, CS2 select signals are inactive, then OR gate 458 is activated to turn "ON" gate 460 at 506. At 508, the output from gate 460, 452 and 414 are ANDed to turn "ON" gate 456 resulting in the NVMWR signal going active at 510.

If, at 512, any two NVM1, NVM2 or NVM3 signals are active then the corresponding AND gate 438, 440 and/or 442 is set active at 514. OR gate 444 is then set active to turn "OFF" gate 452 at 516 which results in AND gate 450 being held "OFF" at 518. If, at 512, any two NVM1, NVM2 or NVM3 signals are not active then OR gate 444 is held "OFF" resulting in gate 452 being turned "ON" at 520. The output from gate 460, 452 and 414 are ANDed resulting in gate 456 being turned "ON" at 522. As a result the NVMWR signal is set active at 524.

Figure 4D:
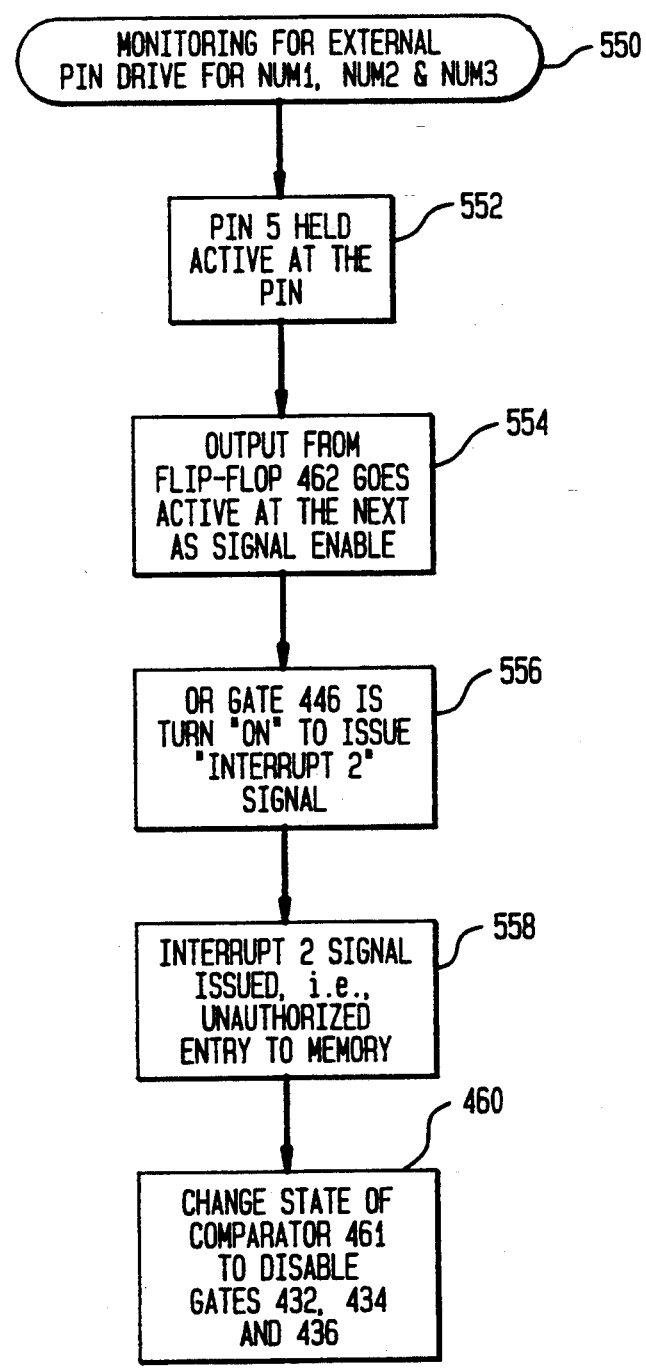
FIG. 4D is a logic diagram of the ASIC monitoring circuit in accordance with the present invention.

Referring to FIG. 4D, the system also monitors, at 550, the appropriate ASIC pins to assure that the pins for NVM1, NVM2 and NVM3 detect whether the pins are externally drive to gain unauthorized access to the memories. In order to gain access, both the NVMWR pin and one of the NVM pins P6, P7 or P8 must be held active. At 552, when pin 5 is externally activated without the presence of AS signal, the output from flip-flop 462 goes active at the next enabling of AS. As a result, OR gate 446 is turned "ON" to issue "Interrupt 2" signal at 556. At 558, the "Interrupt 2" signal is recorded as an unauthorized entry to memory. Now at 460, the change of state of a gate 461 disables AND gates 432, 434 and 436, thereby disabling the meter NVM memory access.

What is claimed is:

1. A data verification system including a verification circuit for verifying the validity of data generated by a microprocessor which data is first to be written to said verification circuit and subsequently written to a memory unit once said data is verified by said verification circuit, an electrical bus provides electrical signal communication between said microprocessor, said verification circuit and said memory unit comprising:

said microprocessor to generate said data in an original form and an encrypted data form, said verification circuit having verifying circuit means for receiving said data in said encrypted data form and original data form and decrypting said encrypted data form, and for comparing said decrypted data with said original data form, and generating an enable signal only if said comparison is true, an address decoder means for receiving said signals from said microprocessor and causing a memory write enable signal to be generated and directed over said bus to said memory unit only if said circuit means has generated an enable signal.

2. A data verification system including a circuit as claimed in claim 1 wherein said verification circuit further comprises:

register means in communication with said bus and said verifying circuit means, means for reading decryption parameters from said memory unit and for writing decryption parameters in said register means during power-up of said verification system, said verifying circuit means to decrypt said data in accordance with said decryption parameters.

3. A data verification system including a circuit as claimed in claim 1 further comprising means for generating an interrupt signal should said comparison be untrue.

4. A data verification system including a circuit as claimed in claim 1 further comprising timer means enabled upon enabling of said verifying circuit means for generating a time-out signal should said enable signal not be generated prior to said timer means timing out.

5. A data verification system including a circuit as claimed in claim 1 further comprising means for generating a interrupt signal when said timer time-out signal is presented.

6. A data verification system including a circuit for verifying that the validity of data generated by a microprocessor which data is first to be written to said verification circuit and subsequently written to a memory unit once said data is verified by said verification circuit, an electrical bus provides electrical signal communication between said microprocessor, said verification circuit and said memory unit comprising:

said microprocessor to generate said data in an original form and an encrypted data form, said verification circuit having verifying circuit means for receiving said data in said encrypted data form and original data form and decrypting said encrypted data form, and for comparing said decrypted data with said original data form, and generating an enable signal only if said comparison is true, an address decoder means for receiving said signals from said microprocessor and causing a memory write enable signal to be generated and directed over said bus to said memory unit only if said verification circuit means has generated an enable signal, register means in communication with said bus and said verification circuit means, means for reading decryption parameters from said memory unit and for writing decryption parameters in said register means during power-up of said verification system, said verifying circuit means to decrypt said data in accordance with said decryption parameters.

7. A data verification system including a circuit as claimed in claim 6 further comprising timer means enabled upon enabling of said verifying circuit means for generating a time-out signal should said enable signal not be generated prior to said timer means timing out.

8. A data verification system including a circuit as claimed in claim 6 further comprising means for generating a interrupt signal when said timer time-out signal is presented.

* * * * *